United States Patent

Ault

[15] 3,701,130

[45] Oct. 24, 1972

[54] MEMORY ACCESS SYSTEM

[72] Inventor: Cyrus Frank Ault, Wheaton, Ill.

[73] Assignee: Bell Telephone Laboratories, Incorporated, Murray Hill, N.J.

[22] Filed: Feb. 10, 1971

[21] Appl. No.: 114,295

[52] U.S. Cl. ....................340/174.1 J
[51] Int. Cl. ....................G11b 27/10
[58] Field of Search....340/174.1 A, 174.1 C, 174.1 J

[56] References Cited

UNITED STATES PATENTS

| | | | |
|---|---|---|---|
| 3,185,972 | 5/1965 | Sippel | 340/174.1 C |
| 3,337,852 | 8/1967 | Lee et al. | 340/174.1 C |
| 3,375,507 | 3/1968 | Gleim et al | 340/174.1 J |
| 3,479,664 | 11/1969 | Stuart-Williams et al. | 340/174.1 C |
| 3,546,686 | 12/1970 | McPherson et al. | 340/134.1 C |

*Primary Examiner*—Vincent P. Canney
*Attorney*—R. J. Guenther and R. B. Ardis

[57] ABSTRACT

A memory controller, in compliance with a memory access request from a central processor, selectively accesses a revolving memory surface. The memory controller supervises this access by expanding a memory position address specifying the memory access apparatus' relationship to the revolving memory surface, and then comparing the expanded position address with a requested address which designates a memory zone to which access is desired. A straightforward expansion of the memory position address is made possible by beneficially organizing the addresses identifying the memory zones on the memory surface.

13 Claims, 7 Drawing Figures

INVENTOR
C.F. AULT
BY
Daniel E. Nester
ATTORNEY

MEMORY ACCESS SYSTEM

1. Field of the Invention

My invention is concerned with a data processing system and, more specifically, with apparatus for supervising and controlling access to memory zones on a moving memory surface, for example, a revolving magnetic disc.

2. Description of the Prior Art

In data processing systems, the central processor often requests access to memory at specified memory locations, and initiates the access by communicating to the memory controller both the type of access desired (e.g., read or write, and a requested address specifying the memory location to which access is requested. The memory controller then accesses the requested memory location and informs the system, usually the central processor, when data has been retrieved from or stored in the requested memory location, depending upon the type of access desired. The memory controller processes the access request essentially independent of central processor control and, therefore, does not utilize valuable central processor time to effect the requested access.

In many data processing systems, data is stored on one or more moving memory surfaces, such as revolving magnetic discs or drums. Data on the memory surfaces is retrieved from or stored in specified memory zones by selectively enabling access apparatus (usually read-write heads) at the instant time the memory zone to which access is requested is present under the access apparatus.

The memory controller compares the requested address, communicated from the central processor, with a memory position address, specifying the instant position of the revolving memory surface in relation to the access apparatus, in order to ascertain if the memory surface is presently situated such that the requested memory zone may now be accessed.

The memory position address is usually of a different format than the requested address. Thus the memory position address and the requested address cannot be compared directly for equivalence. Therefore, in order for the central processor to communicate with the memory controller, the requested address must be translated into a format comprehendible by the memory controller. This translation is generally accomplished by any of several arrangements, For example, in one prior art arrangement the central processor translates the requested address into the format utilized by the memory controller. This translation requires valuable processor time which might better have been utilized for other information processing. In another arrangement, the memory controller translates the requested address into the proper format utilizing a multigate translator. This translator is necessarily complex since the number of potential requested address codes is much greater than the number of addressable memory zones on each memory surface.

After the requested address has been translated into the proper format, the memory controller, in response to the translated address, determines whether a predetermined positional or time-space relationship presently exists between the access apparatus and the requested memory zone. As previously stated herein, this determination is made by comparing the requested address with the memory position address. Equivalence of the two addresses indicates that the memory controller may then initate the requested access operation, in accordance with the predetermined time-space relationship by selectively enabling the access apparatus to either retrieve or store data in the memory zone indicated by the requested address.

It is an object of my invention that a memory controller selectively access memory for a central processor without translating the requested address provided by the central processor into a format utilized by the memory controller.

It is a further object of this invention to address the memory locations on a moving memory surface using a format that efficiently codes the actual number of addressable memory locations on the memory surface into 2 minimum length word.

SUMMARY OF THE INVENTION

In accordance with one illustrative embodiment of the principles of my invention, a memory controller continuously enables access apparatus to monitor a sequence of base memory position addresses stored on a moving memory surface. The base memory position address monitored at a given instant defines a plurality of zone addresses which identify the memory zones on the memory surface presently positioned for initiation of access thereto. The memory controller generates these zone addresses from the monitored base memory position address by sequentially adding to the base address, in a predetermined sequence, a plurality of key numbers, thereby generating the zone addresses as resultant sums. Each of the zone addresses, as generated from the base address, is compared by a comparator with a zone address provided by a central processing unit which identifies a requested memory zone to which access is requested. Equivalence of the zone addresses indicates that access to the requested memory zone can presently be initiated. Actual track logic, in response to an equivalence signal from the comparator, derives information specifying the track containing the requested memory zone, and so informs memory control logic. The memory control logic supervises the access operation; and, on accordance with both the track information received from the comparator and the type of access requested by central processor, selectively enables the access apparatus to either retrieve data from or store data in the requested memory zone on the specified track.

In this one illustrative embodiment, a moving multitrack memory surface is divided into a plurality of groups of tracks. Each group of tracks is assigned a unique track group number. Each of the tracks is divided into a plurality of addressable memory zones which are each assigned a zone address unique within the track group containing the memory zone. Thus, each memory zone is identified by a combination of a track group number and a zone address, which is also called a zone count number.

More specifically, in accordance with this illustrative embodiment, the central processing unit requests access to a requested memory zone by providing the memory controller with a requested address which identifies the track group number and the zone count number assigned the requested memory zone. A base position address is retrieved from a position track on the memory surface and defines the zone count numbers identifying all of the memory zones having a predetermined positional or time-space relationship to the access apparatus.

The memory controller, under the supervision of the memory control logic, sequentially expands the monitored base memory position address. A sequencer, in response to successive signals from the memory control logic, causes an adder to sequentially expand the base address into a plurality of zone count numbers. The zone count numbers are generated by sequentially adding a plurality of key numbers to the base address. Each key number has a fixed relationship to a predetermined zone count number assigned a memory zone in a different correspondingly positioned track in each track group. These zone count numbers, in combination, identify those memory zones positioned such that access thereto can be initiated.

Each of the generated zone count numbers is compared with the zone count number specified by the requested address. A match indicates that access to the requested memory zone may be initiated as soon as the actual track logic deduces the actual track containing the requested memory zone and so informs the memory control logic. In this one illustrative embodiment, the actual track logic deduces the actual track from the combination of the track group number and information from the sequencer identifying the key number which was added to the base address to obtain a matching zone count number. Upon reception of the actual track information , the memory controller selectively enables the access apparatus to access the requested memory zone on the proper track.

In accordance with a feature of my invention, the memory controller expands the memory position address and compares the expanded address directly with the requested address specified by the central processor. A match indicates that a predetermined positional or time-space relationship exists between the memory zone to which access is requested and the access apparatus.

In accordance with another feature of my invention, the addressable memory zones on the memory surface are identified by a combination of information specifying the group of tracks in which the zone is located and a zone count number associated with a correspondingly designated zone in each group of tracks. The tracks are beneficially grouped so that both the number of memory zones in each track group and the number of track groups are each equal or approximately equal to a binary number, thus minimizing the binary word length necessary to specify any of the addressable memory zones.

GENERAL DESCRIPTION

Figures 3, 4:
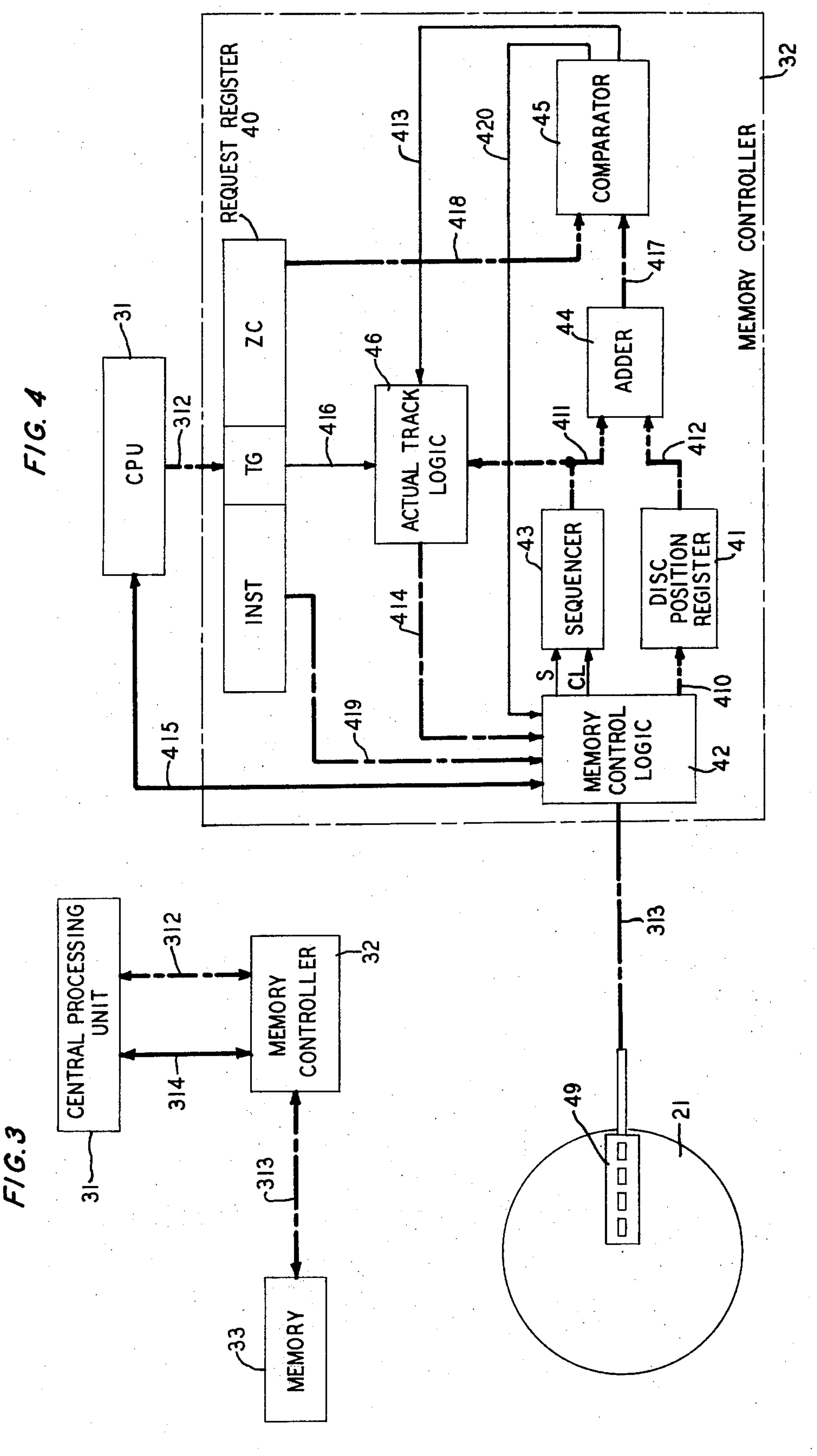
FIG. 3 is a block diagram of a memory access system.
FIG. 4 is a block diagram exhibiting, in more detail, the memory controller shown in FIG. 3.

FIG. 3 is a block diagram representation of a typical data processing system in which my invention can be advantageously employed. Central processing unit (CPU) 31 is a well-known, general purpose computer having memory capacity and at least one processor for performing arithmetic and logical operations on data in accordance with stored sequences of instructions. Additional memory capacity for the storage of data and/or program is provided by memory 33 which, in this illustrative embodiment, comprises a moving memory surface such as, for example, a revolving magnetic disc. Memory controller 32 serves as the interface between CPU 31 and memory 33 by selectively accessing memory locations in memory 33 in compliance with memory access requests from CPU 31. Memory controller 32 independently supervises and performs the requested memory access operation, and signals CPU 31 when the operation has been successfully completed. Thus CPU 31 is able to do additional data processing while memory controller 32 autonomously handles the access request. If the access request is for the storage of data, memory controller 32 buffers the data transmitted from CPU 31, initiates storage of the buffered data in the specified memory location of memory 33, and then signals CPU 31 when the requested memory operation has been completed. If, on the other hand, data is to be retrieved, memory controller 32 accesses the specified memory location of memory 33, buffers the requested data, and signals CPU 31 when the requested data is available. CPU 31, in accordance with its program, then retrieves the data from the buffers in controller 32.

PRIOR ART ARRANGEMENT FOR IDENTIFYING MEMORY ZONES ON A DISC SURFACE

Figure 1:
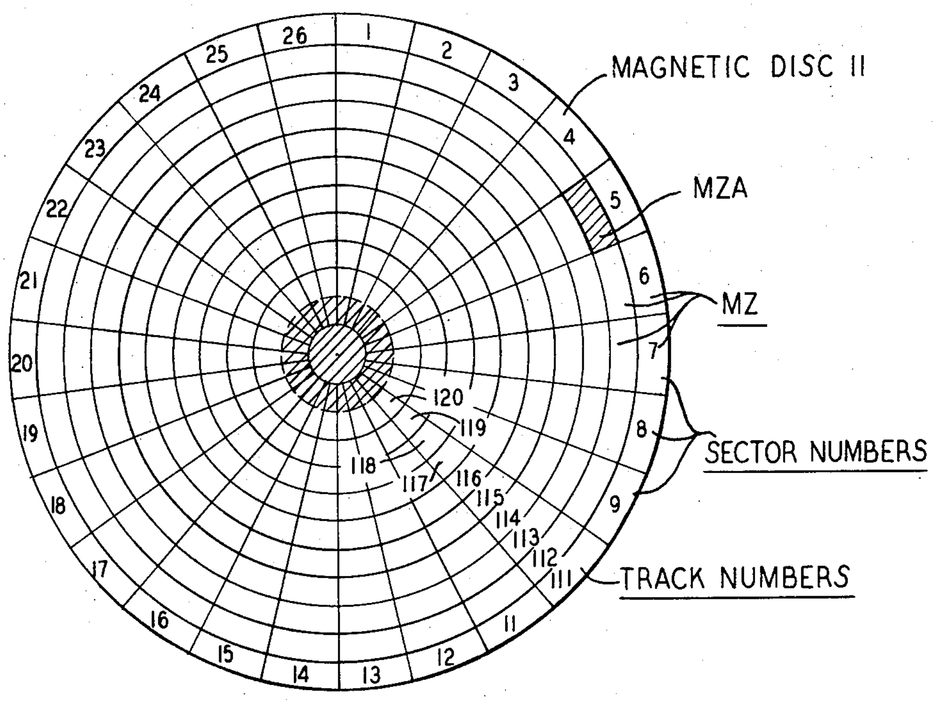
FIG. 1 (PRIOR ART)
FIG. 1 shows a prior art technique used for sectorizing a memory surface.

FIG. 1 illustrates a typical prior art organization for identifying addressable memory zones on a disc memory surface. Disc 11 is divided into a plurality of sectors 1–26, intersected by a plurality of tracks 111–120, thereby defining a unique memory zone MZ at each such intersection. Each unique memory zone is identified by information specifying both a sector number and a track number. For example, the shaded memory zone MZA is identified by sector number 5 and track number 112.

In binary notation, five bits are required to defined a unique one of the 26 possible sectors and four bits are required to define a unique one of the ten possible tracks. Thus, nine bits are required to uniquely identify any one of the 260 memory zones on disc 11. A nine bit word is capable of specifying 512 potential codes whereas the identification of all of the memory zones on disc 11 requires only 260 codes. Thus, this prior art memory zone identification arrangement is highly inefficient since almost one-half of the potential codes are not utilized. This inefficient coding is wasteful of the memory spaced used at the central processor to define address codes identifying memory zones on the disc, and also makes it complex to translate from the many available codes into the relatively few valid disc address codes.

IMPROVED ARRANGEMENT FOR IDENTIFYING MEMORY ZONES ON A DISC SURFACE

Figure 2:
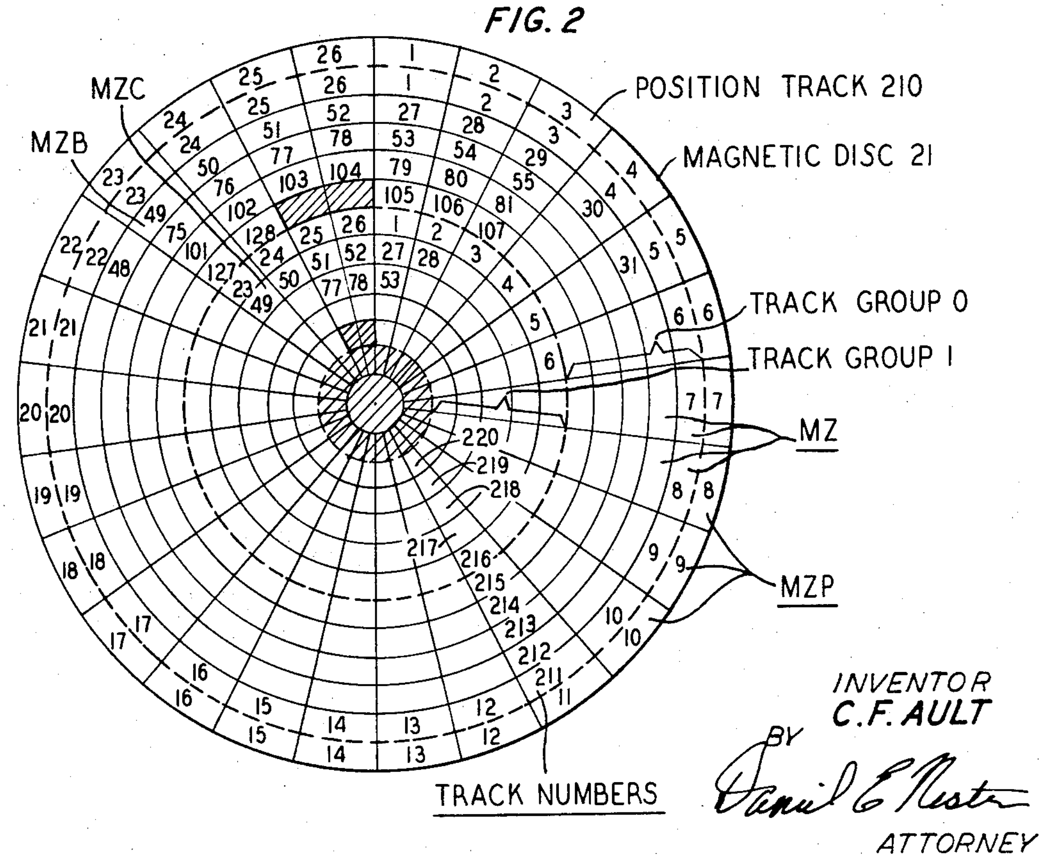
FIG. 2 illustrates a memory zone address identification arrangement in accordance with the principles of my invention.

FIG. 2 illustrates an arrangement for identifying the memory zones of a disc memory surface in accordance with the principles of my invention. Disc 21 is divided into a plurality of tracks 210–220, intersected by a plurality of sectors 1–26, thereby defining a unique memory zone MZ or MZP at each such intersection. It is realized that in an actual application of my invention the memory zones on successive tracks of disc 21 could be skewed or slipped to allow time for the read-write heads of access apparatus 49 to switch between tracks in order to access successively numbered memory zones. For example, a single read-write head could access memory zone 26 on track 211 and then immediately access memory zone 27 on adjacent track 212 if memory zones 26 and 27 were skewed to allow time for the head to switch between tracks. However, for reasons of clarity in explaining my invention, this attribute purposely is not illustrated in any of the figures showing magnetic disc 21.

The outermost track 210 is a position track utilized to store, in each of the 26 memory zones MZP, one of the sector numbers 1–26, hereinafter called base zone count numbers. The inner 10 tracks 211–220 are divided into two track groups 0 and 1, which respectively comprise the tracks 211–215, and 216–220. Each of the unique memory zones MZ in each of the track groups 0 and 1 is addressable and is assigned one of the zone count numbers 1–128. Similarly positioned memory zones MZ in each track group 0 and 1 are assigned the same zone count number. For example, memory zones MZB in track group 0 and MZC in track group 1 are assigned the same zone count number 49.

Identification of a single memory zone MZ requires information specifying both a zone count number and a track group number. For example, memory zone MZB is identified by zone count number 49 and track group number 0.

In binary notation, seven bits are needed to specify one of the possible 128 zone count numbers and one bit is needed to specify one of the two possible track group numbers. Thus eight bits are required to specify a unique one of the 256 available addressable memory zones on the disc. Since eight bits are capable of uniquely defining 256 potential codings, and as there are exactly 256 available memory zones, this arrangement for identifying the memory zones results in a highly efficient coding. The memory space needed at the central processor to define address codes for accessing the disc is utilized to the fullest extent. Furthermore, since there is a one-to-one correspondence between potential and actual codes identifying the memory zones, translation operations are not needed to resolve any discrepancy between valid disc address codes and a large number of available codes which do not define any of the memory zones on the disc, as was required by the prior art arrangement of FIG. 1. The one-to-one correspondence between potential and actual codes is realized by not assigning a designation zone count number to two of the memory zones in each of the tracks 215 and 220, thus reducing the number of addressable memory zones in each track group from 130 to 128.

The previously mentioned base zone count numbers 1–26, stored on position track 210, are numerically related by a set of key numbers to the zone count numbers identifying all the memory zones in the same sector as the given base zone count number. One way of defining the set of key numbers utilized in this specific embodiment for addition to the zone count number is by the progression $0, s, 2s, 3s \cdots (N-1)s$ considering that there are $s$ sectors and that $N$ is the maximum number of tracks containing addressable memory zones in a group. In the illustrative embodiment where $s$ equals 26 and $N$ equals 5, the key numbers to be successively added to the base zone count number in the position track are 0, 26, 52, 78, 104. The zone count numbers identifying all the memory zones in the same sector as a given base zone count number can be generated by adding each of the key numbers to the base zone count number. For example, the respective zone count numbers 24, 50, 76, 102, 128 assigned the memory zones in sector 25 can be generated by adding the key numbers 0, 26, 52, 78 and 104 respectively to base zone count number 24.

MEMORY CONTROLLER

FIG. 4 is a block diagram of an illustrative memory controller that implements an addressing technique utilizing the memory zone identification arrangement of FIG. 2. Memory controller 32 of FIG. 4 corresponds to memory controller 32 shown in FIG. 3, and disc 21 of FIG. 4 corresponds to magnetic disc 21 depicted in FIG. 2.

Memory controller 32, by selectively accessing memory in compliance with a memory access request from CPU 31, serves as the interface facility between disc 21 and CPU 31. Memory controller 32 independently supervises the memory access operation defined by the memory access request and signals CPU 31 when the access has been successfully completed. If the requested memory access is for the retrieval of data, CPU 31 obtains the requested information from buffers in memory controller 32 after memory controller 32 signals that the access has been successfully completed. If the requested memory access is for the storage of data, memory controller 32 buffers the requested data, initiates storage of the buffered data in the requested memory zone on disc 21, and then signals CPU 31 upon completion of the storage operation.

Memory access requests from CPU 31 are received by memory controller 32 over cable 312 and stored in request register 40. Each memory access request specifies three information items, INST, TG, and ZC. INST identifies the type of access requested (e.g., read or write). In accordance with the memory zone identification arrangement of FIG. 2, TG specifies the requested track group number 0 or 1 and ZC specifies the requested zone count number 1–128 which, in combination, uniquely identify the memory zone to which access is requested.

Memory controller 32, before it can enable access apparatus 49 to access the requested memory zone, must first determine if the requested memory zone is presently accessible (i.e., appropriately positioned with respect to access apparatus 49). Memory controller 32 makes this determination by continuously monitoring the base zone count number 1–26 stored on position track 210 of disc 21, and by sequentially adding each key number to the base zone count number presently monitored. Requested zone count number ZC is then compared with each of the resultant sums, each of which is a zone count number identifying a presently accessible memory zone in each of the track groups 0 and 1. A match indicates that the requested memory zone is accessible.

Memory controller 32 is synchronized to sequentially add each of the five key numbers to the base zone count number and compare each of the resultant sums with the requested zone count number ZC in a time duration substantially before the next base zone count number on track 210 is monitored. Thus, memory controller 32 has ample time to initiate access to the requested memory zone once it is determined to be accessible.

Memory control logic 42 supervises the operation of the elements comprising memory controller 32 and also has buffer memory for storing data in transit between CPU 31 and disc 21. Memory control logic 42 controls access apparatus 49 to continuously monitor position track 210 of disc 21. Disc position register 41 stores the base zone count number continuously read from position track 210 by access apparatus 49 under the control of memory control logic 42. Sequencer 43, in response to each signal in a succession of signals from memory control logic 42, signals adder 44 to add in sequence one of the plurality of key numbers to the base zone count number stored in disc position register 41. Each resultant sum of a key number and the base zone count number is a zone count number which identifies a presently accessible memory zone in each of the track groups 0 and 1. Comparator 45, in order to determine if the requested memory zone is presently accessible, compares each of the resultant sums with the requested zone count number ZC, stored in request register 40. A match indicates that the requested memory zone is positioned for initiation of access thereto.

When signaled over lead 413 by comparator 45 that a match has occurred, actual track logic 46 deduces the actual track (i.e., 211–220) to which access is specified, from the combination of the requested track group number TG stored in request register 40, and information received from sequencer 43 over cable 411 indicating which of the five key numbers was added to cause the match. Memory control logic 42, in compliance with a signal over cable 414 from actual track logic 46 defining the actual track of the requested memory zone, enables access apparatus 49 to access the identified track, thereby accessing the requested memory zone.

If INST, the instruction item stored in request register 40, specifies a write instruction, memory control logic 42 enables access apparatus 49 to store in the requested memory zone the buffered data, previously transmitted by CPU 31 over bus 415 and stored in memory control logic 42. When the storage operation has been successfully completed, memory control logic 42 signals CPU 31. If INST specifies a read instruction, memory control logic 42 enables access apparatus 49 to retrieve data from the requested memory zone, buffers the retrieved data, and signals CPU 31 when the requested data is available.

DETAILED DESCRIPTION

The following discussion elaborates the manner in which memory controller 32, in accordance with my invention, responds to a specific memory access request from CPU 31.

ILLUSTRATIVE DISC POSITION WHERE THE REQUESTED MEMORY ZONE IS NOT ACCESSIBLE

Figure 6:
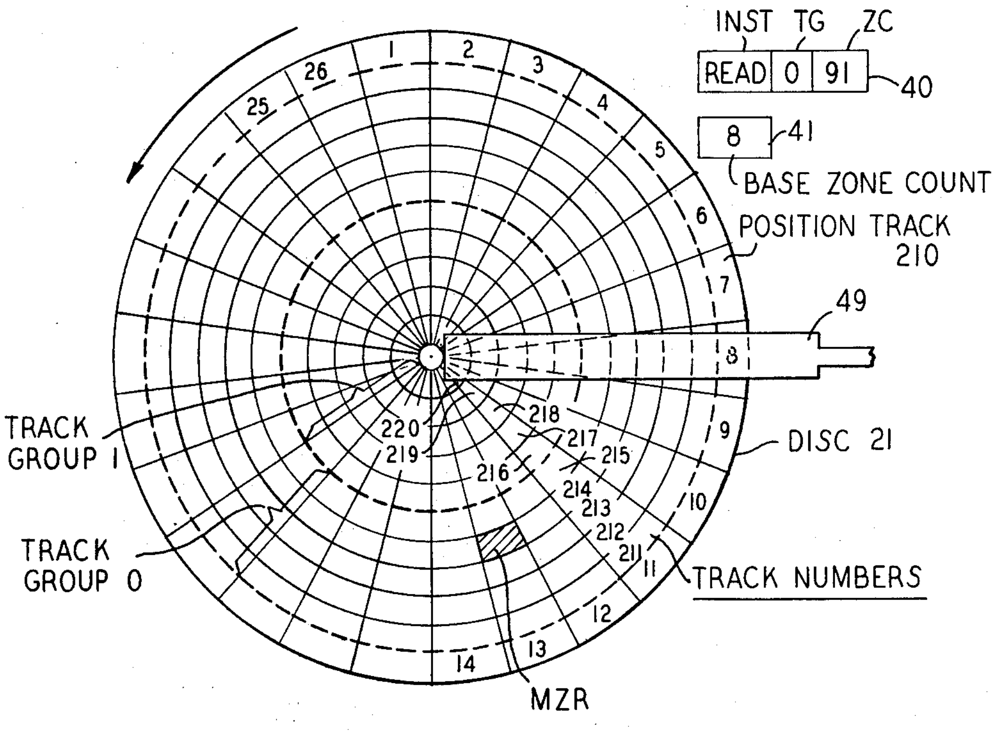
FIG. 6 exhibits an illustrative disc position where the memory surface is not properly situated for initiating access to the memory zone specified by the requested address.

FIG. 6, showing an illustrative disc position where the requested memory zone is not presently accessible, is utilized in association with FIG. 4 as a vehicle for describing how memory controller 32 responds to an access request from CPU 31 and ascertains that the requested memory zone is not in position for initiation of access thereto. Disc 21, access apparatus 49, request register 40, and disc position register 41, all shown in FIG. 6, each respectively corresponds to its numerically identical counterpart of FIG. 4.

CPU 31 requests access to a specified memory zone on disc 21 by communicating a memory access request to memory controller 32 via cable 312. As illustrated in FIG. 6, this memory access requested is stored in request register 40 in the form of three distinct information items, INST, TG, and ZC. INST identifies that a retrieval of data is requested since the word READ is specified. Information items TG and ZC, in combination, specify that the requested memory zone is assigned zone count number 91 in track group number 0. The requested memory zone, in accordance with the memory zone identification arrangement of FIG. 2, is shown as shaded memory zone MZR in FIG. 6.

Memory controller 32, in order to deduce which of the memory zones are presently accessible, continuously monitors the base zone count numbers 1–26 stored on position track 210. Base zone count number 8, presently beneath access apparatus 49, is retrieved by access apparatus 49 and transferred over cables 313 and 410 to disc position register 41 where it is stored, as shown in FIG. 6.

Memory controller 32, in compliance with the memory access request stored in request register 40, determines if the requested memory zone, as identified by ZC, is presently accessible. This determination is accomplished by sequentially adding key numbers 0, 26, 52, 78, and 104 to base zone count number 8 to respectively generate as resultant sums the zone count numbers 8, 34, 60, 86, and 112. These zone count numbers, in combination, identify all the memory zones on disc 21 which are presently accessible. Each of the generated zone count numbers is compared with ZC 91. Since a match does not occur, memory controller 32 ascertains that the requested memory zone is not accessible.

The above determination is effected by memory controller 32 under the control of memory control logic 42. Memory control logic 42, in response to the memory access request, initiates the successive generation and comparison of zone count numbers by successively signalling sequencer 43 over lead S. Sequencer 43, in compliance to the initial signal from memory control logic 42, outputs a signal over cable 411 causing adder 44 to add the first key number 0 to the base zone count number 8 provided by disc position register 41 via cable 412. Comparator 45 compares resultant sum 8, provided over cable 417 from adder 44, with ZC 91 stored in request register 40. Since 8 and 9 are not equivalent, comparator 45 signals memory control logic 42 over lead 420 that a match has not occurred. Memory control logic 42, in response to the "no match" signal, institutes the second comparison by reactivating lead S. Sequencer 43 then signals adder 44 to add the second key number 26 to the base zone count number 8. Adder 44 output s the resultant sum 34 to comparator 45 which signals memory control logic 42 via lead 420 that a match has not occurred since resultant sum 34 is not equivalent to base zone count number 8.

Similarly, sequencer 43, under the control of memory control logic 42, signals adder 44 to sequentially add each of the remaining key numbers 52, 78, and 104 to base count number 8. Each of the resultant sums 60, 86, and 112 is compared with ZC 91 and, since a match does not occur, memory control logic 42 has ascertained that requested memory zone MZR is not presently accessible. Memory control logic 42 then waits until next base zone count number 9 is retrieved from position track 210 of disc 21, at which time it reinitiates the expansion and comparison of zone counts to determine if requested memory zone MZR is accessible in the new disc position.

ILLUSTRATIVE DISC POSITION WHERE THE REQUESTED MEMORY ZONE IS ACCESSIBLE

Figure 7:
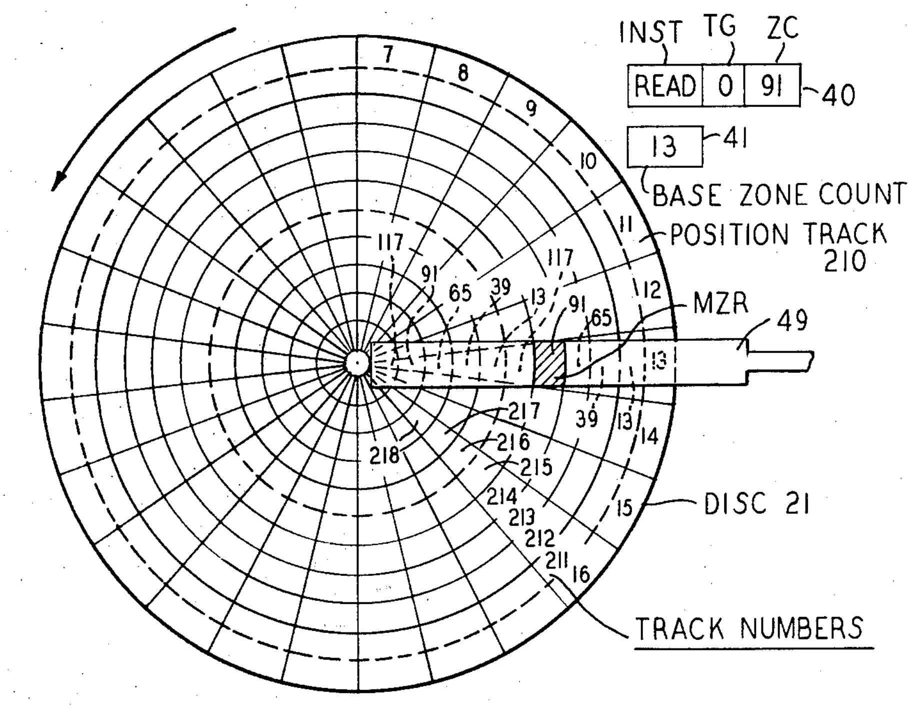
FIG. 7 exhibits another illustrative disc position wherein the memory surface is properly situated for initiating access to the requested memory zone.

FIG. 7 shows disc 21 in a successive time sequel to that illustrated in FIG. 6. The memory access request shown in request register 40 is identical to the memory access request discussed in regard to FIG. 6. Thus, requested memory zone MZR of FIG. 7 corresponds to requested memory zone MZR of FIG. 6. FIG. 7 corresponds to FIG. 6 in all particulars, except that disc 21 has rotated so that the requested memory zone MZR is now under access apparatus 49 and is therefore presently accessible. The following discussion will elaborate how memory controller 32 first determines that the requested memory zone MZR is accessible and then accesses the requested memory zone retrieving the data stored therein for CPU 31.

Memory controller 32, in compliance with the yet unfulfilled memory access request stored in request register 40, continues its determination of whether requested memory zone MZR is accessible. This determination is made by expanding base zone count number 13, the zone count number presently retrieved by access apparatus 49 and stored in disc position register 41. The expanded zone count numbers identifying all the memory zones presently accessible are generated by sequentially adding each of the key numbers to base zone count number 13. Each of these expanded zone count numbers is compared with ZC 91, the information item stored in request register 40 which specifies zone count number 91 identifying the requested memory zone MZR. Since requested memory zone MZR is presently accessible, a match between one of the expanded zone count numbers and ZC will occur thereby causing memory controller 32 first to deduce the actual track containing the requested memory zone and then, utilizing the deduced track information, access the requested memory zone.

The expansion of base zone count number 13 is effected under the control of memory control logic 42 which initiates the expansion by signalling sequencer 43 over lead S. Sequencer 43 then provides a signal over cable 411 specifying for adder 44 to add the first key number 0 to base zone count number 13. Adder 44 outputs resultant sum 13 to comparator 45 which compares ZC 91 with base zone count 13 and signals memory control logic 42 via lead 420 that a match has not occurred. Memory control logic 42 again activates lead S, and as a result, the second key number 26 is added to base zone count number 13. The resultant sum 39 is compared with ZC 91 and since a match does not occur, memory control logic 42 signals sequencer 43 over leads to enable adder 44 to add the third key number 52 to base zone count number 13. Similarly, since the resultant sum 65 is determined not to be equal to ZC 91, comparator 45 signals memory control logic 42 that a match has not occurred. Memory control logic 42 reactivates lead S for the fourth time thereby signalling sequencer 43 to enable adder 44 to add the fourth key number 78 to base zone count number 13. Resultant sum 91, output from adder 44, is compared with ZC 91 and a match occurs thereby indicating that the requested memory zone MZR is presently accessible. Comparator 45 provides a "match" signal on lead 413 which enables actual track logic 46 to deduce the actual track specified by the memory access request. Actual track logic 46 derives the actual track from the combination of the track group number TG 0 stored in request register 40, and information from sequencer 43 received over cable 411 identifying that the fourth key number 78 was added to cause the match. As was previously discussed in regard to FIG. 2, the fourth key number 78 is associated with tracks 214 and 219, i.e., the fourth track in each of the track groups 0 and 1. Since TG 0 is specified, track 214 in track group 0 is the actual track containing the requested memory zone MZR. Thus, actual track logic 46 signals memory control logic 42 over cable 414 that the requested memory zone MZR is presently accessible on track 214.

Memory control logic 42, in compliance with the type of access specified by information item INST, enables access apparatus 49 to retrieve from track 214 the data stored in requested memory zone MZR. The data is retrieved and buffered by memory control logic 42. CPU 31 is then signaled via bus 415 that the requested data is available. CPU 31, in accordance with its stored program, then accesses the requested data buffered in memory control logic 42.

Memory control logic 42, over lead CL, resets sequencer 43 to its initial state before responding to the next memory access request. Thus, upon the subsequent activation of lead S, sequencer 43 will signal adder 44 to add the first key number rather than the key number succeeding that which was added to cause the match.

ACTUAL TRACK LOGIC

Figure 5:
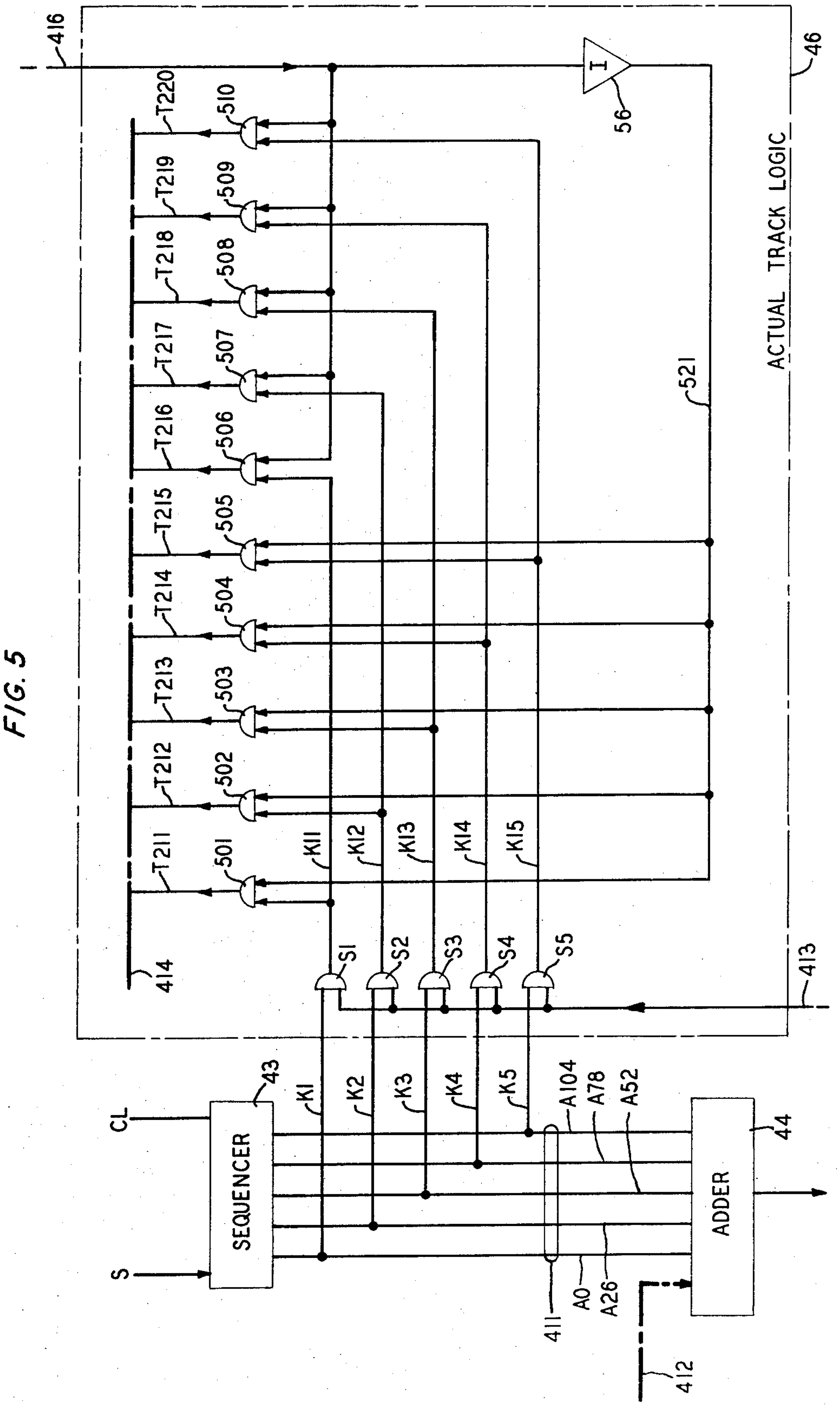
FIG. 5 illustrates in more detail portions of both the sequencer and actual track logic of FIG. 4.

FIG. 5 exhibits one illustrative embodiment of actual track logic 46. Actual track logic 46, sequencer 43, and adder 44, all shown in FIG. 5, correspond to their numerically equivalent counterparts of FIG. 4.

The function of actual track logic 46 is to deduce the actual track to which access is requested and to so inform memory control logic 42. This deduction is performed under the control of comparator 45, since there is no need to deduce the actual track information until it is first ascertained that requested memory zone MZR is presently accessible. Thus, actual track logic 46 is activated by a signal received over lead 413 from comparator 45 indicating that a match has occurred.

Actual track logic 46, when activated, derives the actual track information from the combination of information item TG, which specifies the track group of the requested memory zone, and information received over leads K1–K5 from sequencer 43 indicating which of the key numbers was last added to the base zone count number by adder 44. The determination of the actual track is transmitted to memory control logic 42 by selectively activating one of the leads T211–T220 of cable 414, thereby indicating that the actual track is the numerically coded counterpart track 211–220.

FIG. 5 also exhibits one illustrative means by which sequencer 43 indicates to adder 44 the key number to be added. Each of the key numbers 0, 26, 52, 78, and 104 respectively corresponds to its numerically coded counterpart lead A0, A26, A52, A78, and A104. Sequencer 43 signals adder 44 to add a given key number by activating only the lead associated with that key number. For example, adder 44 adds key number 78 when lead A78 is activated.

The match signal received over lead 413 strobes AND gates 51–55 of actual track logic 46, so that the "1" received over one of the input leads K1–K5 is gated over the corresponding output lead K11–K5, thereby conveying to actual track logic 46 the key number added to cause the match.

As previously discussed, each key number is associated with the single track in each of the track groups 0 and 1 0l from the key number was derived. Key numbers 0, 26, 52, 78, and 104 are respectively associated with the first, second, third, fourth, and fifth track in each track group. Thus, the "1" received over one of the leads K11–K15 indicating the added key number, also specifies a potential track in each track group on which the requested memory zone could be located. Thus, to uniquely specify the actual track, it is necessary to consider TG, which specifies the track group in which the requested memory zone is located, in combination, with the key number information.

Actual track logic 46 deduces the actual track information by gating the key number information, received over one of the leads K11–K15, with information item TG received over lead 416. This gating is accomplished by AND gates 501–510, each respectively associated with one of the tracks 211–220. Each of the leads K11–K15, which are used to identify the added key number, is selectively connected to two of the AND gates 501–510 which are associated with the tracks corresponding to the key number. For example, lead K11, which identifies the two tracks 211 and 216 corresponding to the first key number, is connected to gates 501 and 506 similarly associated with tracks 211 and 216.

The track group designation TG, which is stored in request register 40, is transmitted to actual track logic 46 via lead 416. A "1" on lead 416 indicates that the requested memory zone is on one of the tracks in track group number 1, whereas a "0" indicates that the requested memory zone is in track group 0. Lead 416 is connected to gates 506–510, which are associated with the tracks in track group number 1. Lead 521, which conveys the complement of the signal received over lead 416, is connected to gates 501–505, which are associated with the tracks in track group number 0. Thus, for a given track group number, only the gates associated with that track group are activated. For example, if track group 0 is specified, "0" is conveyed via lead 416 to gates 506–510 associated with track group 1, and "1" is conveyed via lead 521 to gates 501–505 associated with track group 0.

The combination of key number information and track group number selectively activates the input leads of AND gates 501–510 so that the single output lead T211–T220, which corresponds to the actual track, is activated. The key number information received over leads K11–K15 activates one input lead of the two gates each associated with a track in a different track group. The track group number activates one input lead of the five gates associated with the specified track group. Therefore, only one gate has both input leads activated. This one gate is associated with the actual track of the requested memory zone and outputs a "1," thereby signalling the actual track information to memory control logic 42.

As an illustrative example of the operation of actual track logic 46 consider the deduction of the actual track containing the requested memory zone by actual track logic 46 in regard to the memory access operation discussed in FIG. 7. In FIG. 7, the memory access request stored in request register 40 specifies that the requested memory zone MZR is situated on one of the tracks in track group 0. Therefore, as previously discussed, a "0" is conveyed from request register 40 via lead 416 to AND gates 506–510 thereby disabling the gates associated with the tracks in track group 1. Inverter 56 complements the "0" received over lead 416, and conveys a "138 via lead 521 to AND gates 501–505, each associated with a track in track group 0.

In regard to FIG. 7, a match between the requested zone count number 91 and the expanded memory position zone count numbers occurs when the fourth key number 78 is added to base zone count number 13. Comparator 45 detects the match and, by providing a "1" on lead 413, enables actual track logic 46 to indicate to memory control logic 42 the actual track containing the requested memory zone. The "1" received over lead 413 from comparator 45 strobes gates 51–55 of actual track logic 46. Since key number 78 was added to cause the match, lead A78 conveys a "1" via lead K4 to gate 54 whereas the other gates 51, 52, 53, and 55 remain deactivated. Thus, when gates 51–55 are strobed by the "1" received from comparator 45, only gate 54 outputs a "1," which is then conveyed to gates 504 and 509 via lead K14. Since gate 509 was deactivated by the "0" received over lead 416, gate 504 along provides a "1" output, which is transmitted over lead T214 to indicate to memory control logic 42 that access is to be commenced to the requested memory zone on track 214.

What is claimed is:

1. The combination comprising:

a moving memory surface having a plurality of tracks each divided into a plurality of discrete memory zones for storing data, apparatus for selectively accessing those of said memory zones having a predetermined time-space relationship to said apparatus, means for providing a requested address which identifies a requested memory zone on said memory surface to which access is requested, means for providing a memory address which defines all of said memory zones having said predetermined time-space relationship to said access apparatus, means for expanding said memory address into a plurality of zone addresses which identify each of said memory zones having said predetermined time-space relationship to said access apparatus, means for comparing said requested address with each of said zone addresses and for providing a signal when equivalence thereof is detected, and means responsive to said signal for identifying the track on which said requested memory zone is situated, and for enabling said accessing apparatus to selectively access said requested memory zone on said identified track.

2. The combination according to claim 1 wherein said expanding means comprises means for operating upon said memory address with a predetermined sequence of operands.

3. The combination according to claim 1 wherein said expanding means comprises means for adding to said memory address in a predetermined sequence a plurality of key numbers, each of said key numbers having a fixed relationship to the zone address assigned one of the memory zones in a different one of said tracks.

4. The combination according to claim 1 wherein each of said discrete memory zones on each said track is assigned a unique zone address within a predetermined limit unique to said each track;

said requested address specifies the zone address assigned said requested memory zone;

said expanding means comprises means for adding to said memory address in a predetermined sequence a plurality of key numbers, each of said key numbers having a fixed relationship to said predetermined limit unique to said each track; and said responsive means identifies said track on which said requested memory zone is situated in accordance with signals from said expanding means which identify the key number added, to said memory address to generate the zone address detected equivalent to said zone address specified by said requested address.

5. The combination according to claim 1 wherein said memory address providing means comprises:

a plurality of positionally spaced information items on said moving memory surface, each information item defining all of said memory zones having a predetermined positional relationship to the location of said information item;

means for retrieving an information item which defines those of said memory zones having said predetermined time-space relationship to said apparatus; and means for storing a retrieved information item.

6. A memory control arrangement comprising:

a moving multitrack memory surface divided into a plurality of groups of tracks, each track group assigned a unique track group number, each track divided into a plurality of memory zones, each memory zone assigned a zone address unique within the track group containing said memory zone;

apparatus for accessing said memory zones;

means for providing a requested address which, by specifying a requested zone address and a track group number assigned a requested memory zone, uniquely identifies a requested memory zone to which access is requested;

means for providing a memory address which defines all of said memory zones presently positioned relative to said accessing apparatus for initiation of access thereto;

means for expanding said memory address into a plurality of memory zone addresses which identify each of said memory zones presently positioned relative to said accessing apparatus for initiation of access thereto;

means for comparing said requested zone address with each of said memory zone addresses as expanded from said memory address, and for providing a signal when equivalence thereof is detected; and means activated by said signal and controlled in accordance with a combination of said track group number specified by said requested address and information from said expanding means for identifying the track containing said requested memory zone and for initiating access thereto by said accessing apparatus.

7. A memory control arrangement in accordance with claim 6 wherein said expanding means comprises means for operating upon said memory address with a predetermined sequence of operands.

8. A memory control arrangement in accordance with claim 6 wherein said expanding means comprises means for sequentially adding to said memory address in a predetermined sequence a plurality of key numbers, each of said key numbers having a fixed relationship to the zone addresses assigned the memory zones in correspondingly positioned tracks in each track group, and said information from said expanding means identifies the key number added to said memory address to generate the memory zone address detected equivalent to said requested zone address.

9. A memory control arrangement in accordance with claim 7 wherein said information from said expanding means identifies the one of said operands with which said memory address is operated upon to generate the memory zone address detected equivalent to said requested zone address.

10. A memory control arrangement comprising:

means for providing a memory address defining all memory zones positioned for initiation of access thereto, means for providing a requested address identifying a requested memory zone to which access is requested, means for expanding said memory address into a plurality of zone addresses which respectively identify said memory zones positioned for initiation of access thereto, and means for comparing said requested address with each of said plurality of zone addresses and for providing a signal when equivalence thereof is detected, thereby indicating that said requested memory zone is positioned for initiation of access thereto.

11. The method of ascertaining if a revolving memory surface is positioned in relation to access apparatus to initate access to a requested memory zone on said surface, comprising the steps of:

retrieving from said surface a base memory address stored thereon, expanding said base memory address to generate therefrom a plurality of other addresses identifying memory zones having a predetermined positional relation to said base memory address, and comparing each of said other addresses with a request address identifying a memory zone on said surface to which access is requested.

12. The method according to claim 11 wherein said surface is divided into a plurality of tracks and further comprising the steps of:

developing indicia specifying which one of said plurality of other addresses is equivalent to said request address, translating said indicia to identify a track associated therewith, and accessing the memory zone on said associated track.

13. The method of ascertaining if a revolving memory surface is positioned in relation to access apparatus to initiate access to a requested memory zone on said surface, wherein said surface comprises *s* sectors and at least $N+1$ tracks, $N$ of said tracks containing memory zones to be accessed and one of said tracks being a position track containing a base memory address for each sector, said method comprising the steps of:

retrieving from said position track the base memory address stored thereon for a sector, expanding said base memory address to generate therefrom a plurality of other addresses identifying the memory zones of said sector, said expanding comprising adding to the base memory address the key numbers 0, $s$, $2s$---$(N-1)s$, and comparing each of said generated addresses with a request address identifying the memory zone on said surface to which access is requested.

* * * * *